US006747686B1

(12) United States Patent
Bennett (10) Patent No.: US 6,747,686 B1
(45) Date of Patent: Jun. 8, 2004

(54) HIGH ASPECT STEREOSCOPIC MODE CAMERA AND METHOD

(75) Inventor: Russell A. Bennett, McHenry, IL (US)

(73) Assignee: Recon/Optical, Inc., Barrington, IL (US)

(*) Notice: Subject to any disclaimer, the term of this patent is extended or adjusted under 35 U.S.C. 154(b) by 243 days.

(21) Appl. No.: 09/972,262

(22) Filed: Oct. 5, 2001

(51) Int. Cl.[7] .............................. H04N 9/47; H04N 7/18
(52) U.S. Cl. ......................... 348/145; 348/147; 348/46
(58) Field of Search ................................ 348/144, 145, 348/146, 147, 46

(56) References Cited

U.S. PATENT DOCUMENTS

| 4,527,055 A | 7/1985 | Harkless et al. ............. 250/234 |
| 4,807,024 A | 2/1989 | McLaurin et al. ............. 358/88 |
| 5,138,444 A | 8/1992 | Hiramatsu .................... 358/88 |
| 5,155,597 A | 10/1992 | Lareau et al. .......... 358/213.24 |
| 5,210,586 A | 5/1993 | Grage et al. .................... 356/5 |
| 5,247,356 A | 9/1993 | Ciampa ....................... 358/109 |
| 5,251,037 A | 10/1993 | Busenberg ............. 358/213.28 |
| 5,481,479 A | 1/1996 | Wight et al. ................. 364/525 |
| 5,486,948 A | 1/1996 | Imai et al. ................... 359/462 |
| 5,668,593 A | 9/1997 | Lareau et al. ............... 348/146 |
| 5,798,786 A | 8/1998 | Lareau et al. ............... 348/144 |
| 5,835,133 A | 11/1998 | Moreton et al. .............. 348/49 |
| 5,841,574 A | 11/1998 | Willey ......................... 359/351 |
| 5,852,753 A | 12/1998 | Lo et al. ...................... 396/323 |
| 6,094,215 A | 7/2000 | Sundahl et al. ............... 348/42 |

OTHER PUBLICATIONS

PCT International Search Report, Dec. 6, 2002, issued in International Application No. PCT/US02/28828.
Ken Riehl et al., "The Raytheon DB–110 Sensor: Four Cameras in One Package", Raytheon Systems Company publication, National Military Sensing Symposium, Nov. 1999.

Chicago Aerial Industries Incorporated, *Aerial Reconnaissance Equipment Status Report*, Mar. 1965.
KS–127A Long Range Oblique Reconnaissance Camera for RF–4 Aircraft, Richard C. Ruck & Oliver J. Smith, CAI, a division of Recon/Optical, Inc., SPIE Proceedings, vol. 242, Jul. 29–30, 1989, San Diego, Paper 242–02, p. 22.
KS–146A LORPO Camera System, Thomas Augustyn, CAI, a division of Recon/Optical, Inc., SPIE Proceedings, vol. 309, Aug. 27–28, 19981, paper 309–11, p. 76.

*Primary Examiner*—Chris Kelley
*Assistant Examiner*—Charles Parsons
(74) *Attorney, Agent, or Firm*—McDonnell Boehnen Hulbert & Berghoff (57) ABSTRACT

An aerial reconnaissance camera and method provides for generating a first image of the terrain of interest with the camera pointing angle oriented or rotated about an azimuthal axis some angular amount ($\theta 1$) to a first, typically forward orientation, i.e., forward of a cross-line of flight direction. An image is obtained of the ground at this orientation. Then the camera is rotated about the azimuthal axis to new angular value ($\theta 2$), which will typically be aft of the cross line of flight direction. An image is generated at this value. The camera is then rotated back to the value of $\theta 1$, and a second image in the forward orientation is generated. The camera is then rotated again to the value of $\theta 2$ and another image in the aft orientation is generated. This process of rotating the camera about the azimuthal axis and generating images in forward and aft orientations continues over and over. Eventually, as the aircraft flies past the terrain of interest, any given location in the terrain of interest will have been imaged from two different perspectives—forward and aft. The motion of the aircraft during the interim in combination with the values of $\theta 1$ and $\theta 2$ provide the high baseline for the stereo image pairs. By selection of suitable values for the angular separation of $\theta 1$ and $\theta 2$ (such as $\theta 1=+10$ degrees and $\theta 2=-10$ degrees) the result will be pairs of images of the terrain of interest having a large baseline, producing truly high aspect stereo images from a single camera. The method also works in a similar fashion by rotation back and forth about the pitch axis and imaging the terrain in forward oblique and aft oblique orientations.

23 Claims, 10 Drawing Sheets

HIGH ASPECT STEREOSCOPIC MODE CAMERA AND METHOD

BACKGROUND OF THE INVENTION

A. Field of the Invention

This invention relates generally to the field of cameras used for aerial reconnaissance, aerial surveying, mapping and other applications in which the camera is placed onboard a moving vehicle. The invention also relates to a method of operating such a camera so as to obtain high aspect stereo imagery of the earth in a manner such that an increased amount of three-dimensional information can be obtained of the terrain of interest as compared to prior methods. The invention is particularly well suited to both framing camera and line scanning cameras, and cameras based on either film or electro-optical image recording media.

B. Description of Related Art

Figures 1, 1A:
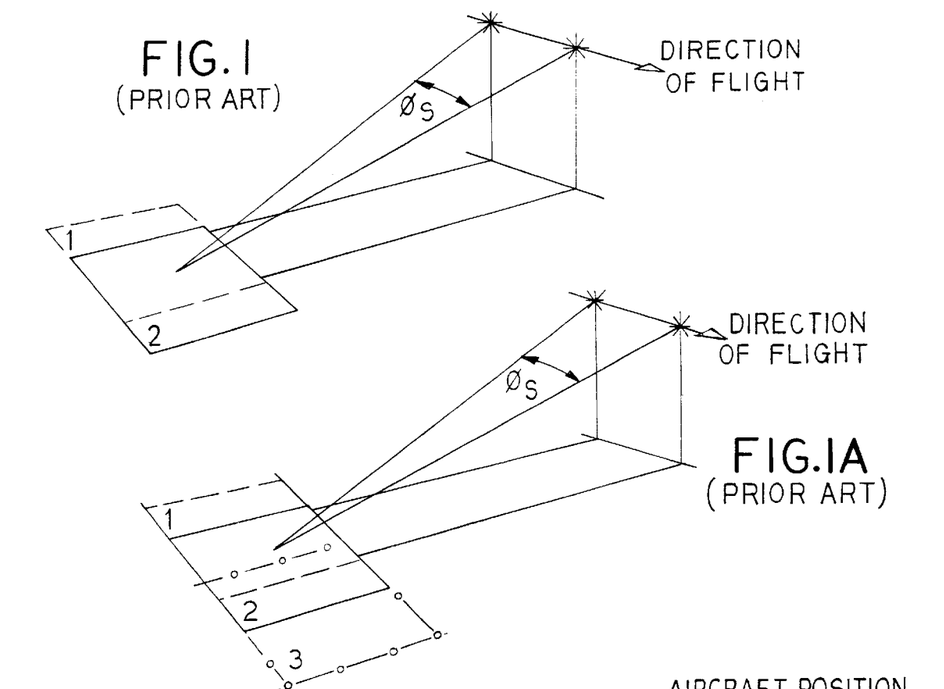
FIG. 1 is a schematic representation of overlapping images generated by an aerial reconnaissance camera in accordance with a prior art technique, in which the stereo coverage is limited by the field of view of the camera and the overlap.
FIG. 1A shows how three images must be captured with the prior art using successive frames and a 50 percent overlap in order to produce stereo at all points in the imaged terrain.

The traditional method for collection of stereo imagery using a reconnaissance camera provides for the capture of images in successive scan cycles with at least 50% forward overlap (56% is a typical value). Two pictures are taken of each point on the ground from two successive camera positions along the flight path. The imaging geometry is usually side oblique or vertical (camera pointed at nadir). In side oblique the azimuth pointing angle is at 90 degrees relative to the flight direction. Coverage across the line of flight (XLOF) is dependent on the size of the foot print of the field of view of the camera and the aircraft speed which also relates to the ratio of velocity to slant range at the near edge of the footprint. The aircraft position advances only one-half of the near edge length between successive frames, and the maximum stereo angle is one-half of the sensor field of view. This situation is shown in FIG. 1, where $\phi_s$ indicates the stereo angle. Pairs of images 1 and 2 can be recombined by means of a stereo viewing system to achieve depth perception. Such stereo images are often used by a photointerpreter to gather additional information about the scene.

The operation of a film-type framing camera in a stepping mode is known in the art. For example, the article entitled "The KS-146A LOROP Camera System", Thomas C. Augustyn, SPIE Proceedings Vol.9, Aug. 27–28 1981, paper 309–11 p.76, describes an automatic stepping mode in which the camera cycle rate is proportional to aircraft velocity, altitude and selected depression angle, to achieve 56% overlap for stereo viewing or 12% overlap for maximum flight line coverage. With the camera line of sight normal to the flight path, the scan head provides 1, 2, 4, or 6 lateral-step cycles. A similar stepping operation for a frame camera is described in the article entitled "KS-127A Long Range Oblique Reconnaissance Camera for RF-4 Aircraft", Richard C. Ruck and Oliver J. Smith, SPIE Proceedings Vol. 242, Jul. 29–30, 1980 San Diego Paper 242–02, p.22. The contents of both articles are incorporated by reference herein.

An electro-optical step frame camera is described in U.S. Pat. No. 5,668,594 to Lareau et al., the content of which is incorporated by reference herein. In the Lareau et al. '594 patent, a mirror is rotated in series of steps about an azimuthal axis to direct scene information in the cross-line of flight onto the image detector array. An image is obtained at each angular position. Forward motion compensation is performed on-chip. As the camera steps to a new angular position, the scene is read out. By repeating the stepping action in a manner in which an overlap exists between successive frames or between frames in a series of cycles, it is possible to obtain some stereo coverage.

Panoramic (pan) camera technology is another well-established means of imaging. In a panoramic scanning camera, the scene is exposed continuously by rotating a scanning mechanism (such as a double dove prism) so as to scan the image across the photosensitive medium. The photosensitive medium is moved in synchronism with the image. In the case of a film camera, this may be accomplished by moving the film at the same rate as the image rate past an exposure slit which is located on the lens optical axis. A scan prism located in front of the lens is rotated in synchronism with the film rate such that the image of the scene remains stationary on the film during the exposure period. The slit opening is adjusted to a predetermined width to control exposure time.

One major advantage of a pan camera is its ability to image a large area in the direction across the line of flight. Scan angles across the line of flight on the order of 120 to over 180 degrees are typical. The lens field of view in a pan camera is generally only required to be large enough to cover the width of the film. Overlapping of images and stereo imagery may also be obtained with pan cameras. Image overlap in a conventional fixed mounted pan camera is obtained as in the case of a framing camera, that is, in the common area between successive scans. The stereo convergence angle can be up to one half the field of view of the camera, depending on the forward overlap.

The stereoscopic imagery generated by the above methods suffers from a disadvantage, in that the baseline between adjacent stereo images and the associated stereo angle $\phi_s$, are typically relatively small, resulting in "low aspect" stereo image pairs. Consequently, the imagery is only capable of generating minimal three-dimensional information. The art has lacked a method for obtaining stereo pairs that have a high baseline ("high aspect", as that term is used herein) and thus generate a high degree of three-dimensional information about the terrain of interest. The present invention meets that need. Another disadvantage of the prior art is that in order to capture a stereo image of all points in the scene, three images must be taken of that scene and combined when using the typical 50–56% overlap. See FIG. 1A.

Other patents of interest include Busenberg, U.S. Pat. No. 5,251,037; Hiramatsu, U.S. Pat. No. 5,138,444, and Lareau et al., U.S. Pat. No. 5,155,597. Hiramatsu provides a technique for obtaining stereo pairs of imagery of the earth but requires two camera units, one looking in the forward direction and one looking in the aft direction. Furthermore, the drawings and the complexity of the associated circuitry used by Hiramatsu suggest the use of line scan cameras. The complexity is created by the need for the location and registration of scanned lines of imagery. The preferred embodiment of the present invention removes that complexity by utilizing a framing camera. The Lareau patent describes how a electro-optical framing camera can take overlapping frames of imagery to obtain some stereo coverage (like the situation shown in FIG. 1), but the images are not at high aspect since the amount of overlap is limited by the field of view of the camera.

Advantages of the present invention over prior art methods can be summarized as follows:

1. The high aspect stereo coverage of the scene yields much more three dimensional information as to the terrain and objects in the scene as compared to prior art methods. Mensuration techniques can be applied with more accuracy.
2. This invention requires lower complexity due to the use of a single camera vs. the two cameras required by Hiramatsu. There is no requirement for the use of correlation methods to find the stereo complement of a given frame.

3. The stereo angle is variable and can be selected by the operator to accommodate operational constraints such as velocity to slant range ratio or field of regard limitations of the installation.
4. The approach yields wide-angle stereo coverage without a requirement to use a short focal length camera, thus preserving system scale (photographic scale).
5. The achievement of high aspect stereo with a single camera avoids the need to match the lens focal lengths of two or more cameras.
6. The ability to point the Line of Sight (LOS) for the second stereo picture allows for maximum frame overlap between stereo pairs, rather than requiring three frames to cover all points in stereo from a single picture as is required by traditional stereo photography.
7. Fore-aft movements can be done during the inter-frame period, so no additional time is required to image the terrain.

SUMMARY OF THE INVENTION

A new operating mode or method for cameras used in aerial photography is described which allows for generating high aspect stereo imagery of a terrain of interest with a single camera. This mode of operation is available in any camera with fore-aft pointing control. The capability is not dependent on the camera being an E-O camera, since the same effect can be achieved with a film camera.

The method provides for generating a first image with the camera angle rotated about an azimuthal axis some angular amount (θ1) to a first, typically forward orientation, i.e., forward of a cross-line of flight direction. An image is obtained of the ground at this orientation. Then the camera is rotated about the azimuthal axis to new angular value (θ2), which will typically be aft of the cross line of flight direction. An image is generated at this value. The camera is then rotated back to the value of θ1 (or θ1±some value ε), and a second image in the forward orientation is generated. The camera is then rotated again to the value of θ2 (or θ2±some value ε) and another image in the aft orientation is generated. This process of rotating the camera about the azimuthal axis and generating images in forward and aft orientations continues over and over. Eventually, as the aircraft flies past the terrain of interest, any given location in the terrain of interest will have been imaged from two different perspectives—forward and aft. The motion of the aircraft during the interim in combination with the values of θ1 and θ2 provide the high baseline for the stereo image pairs. By selection of suitable values for the angular separation of θ1 and θ2 (such as θ1=+10 degrees and θ2=−10 degrees) ($\phi_s$=20 degree) the result will be pairs of images of the terrain of interest having a large baseline, producing truly high aspect stereo images from a single camera.

As an alternative implementation, the camera can be oriented or pointed relative to the aircraft to generate images about nadir in the vertical forward oblique and vertical aft oblique and the camera pointing device is repeatedly rotated to two angular positions about the aircraft pitch axis. The camera obtains high aspect stereo pairs of images as the aircraft flies directly over the terrain of interest.

While the camera is operating in the side oblique mode (or vertical mode) at an any given azimuthal orientation, one alternative embodiment provides for stepping in the cross-line of flight direction by changing the camera depression angle in a series of incremental movements or positions ("steps") and generating a frame of imagery at each position. The "step-frame" operation of the camera, combined with the rotation of the camera about the azimuthal axis, generates both wide scene coverage in the cross line of flight direction and high aspect stereo images of the terrain.

In another preferred embodiment, the camera is operated in a mixed mode. In addition to operating in a given side oblique or vertical orientation and generating high aspect stereo by looking forward and aft, and in addition to combining this mode with step framing to capture a wide area coverage as described above, the camera may also combine the generation of high aspect stereo with non stereo single frame imagery as part of the reconnaissance mission. In other words, the camera can be rotated to intermediate values of θ (such as θ=0, i.e., cross line of flight direction) and images can be taken at that orientation as well. Furthermore, at any given value of θ, the camera can scan across the line of flight, generate a single frame of image, generate a plurality of frames at different depression angles, or image the terrain in other modes, depending on the type of camera and the requirements of the reconnaissance mission.

BRIEF DESCRIPTION OF THE DRAWINGS

Presently preferred embodiments of the invention will be discussed below in conjunction with the appended drawing figures, wherein like reference numerals refer to like elements in the various views, and wherein.

DETAILED DESCRIPTION OF REPRESENTATIVE PREFERRED AND ALTERNATIVE EMBODIMENTS

Figure 2:
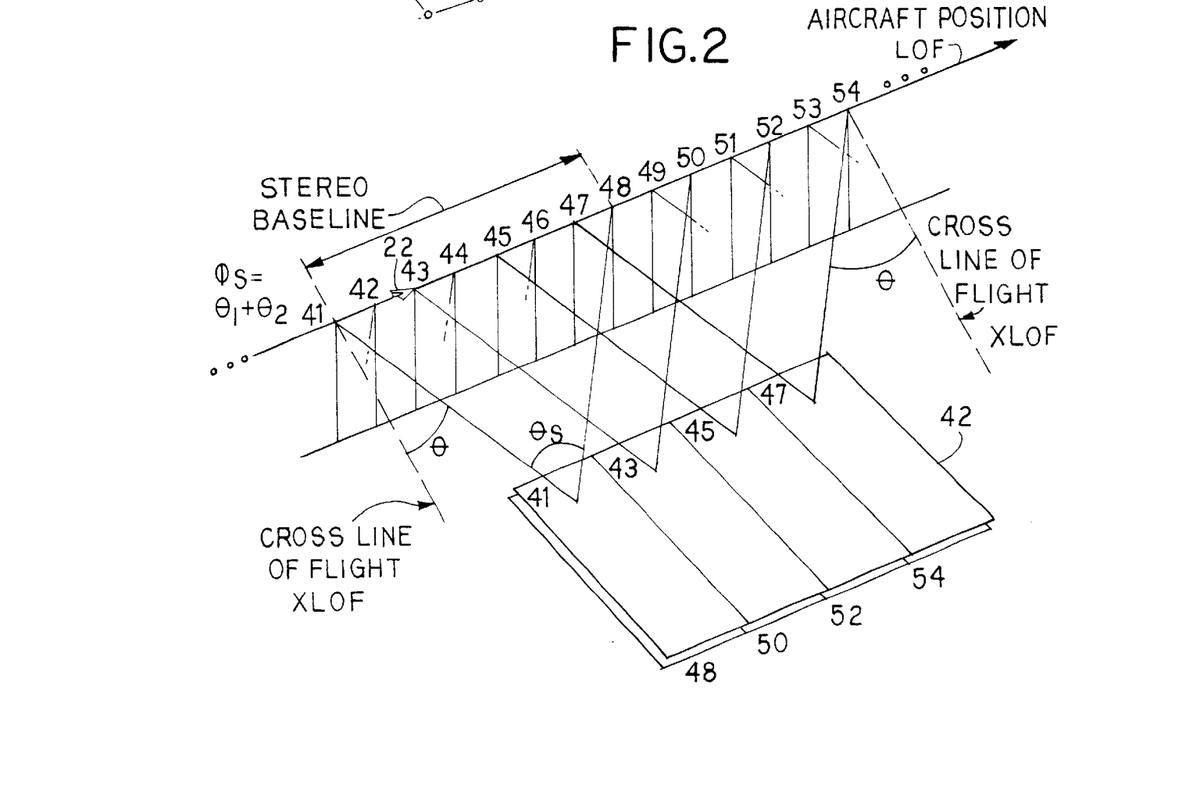
FIG. 2 is a schematic representation of the generation of high aspect stereo pairs of images by an aerial reconnaissance camera in accordance with the techniques of one embodiment of the present invention. The numbers 41, 42, 43, 44 . . . indicate the sequence of images generated by the camera. Note that image 41 is taken in a forward looking direction, image 42 is taken in aft looking direction, image 43 is taken in a forward looking direction, etc. The sequence indicates the repeating pattern of forward and rearward images to generate high aspect stereo pairs in which any given point on the ground is imaged from forward and aft-looking perspectives.

In a first aspect, and with reference to FIG. 2, a method is provided for operating a camera installed in a moving vehicle in a manner to generate high aspect stereo images. The primary application is in aerial photography, therefore the present discussion will be directed to that application. The invention is also applicable to any vehicle that is used to generate stereo imagery, including aircraft, terrestrial vehicles, and surface or submarine water craft.

When the images are generated in a side oblique orientation (a typical scenario in aerial reconnaissance, surveillance and mapping), the method involves repeatedly rotating the camera about an azimuthal axis to generate images at two different azimuthal angles (θ1 and θ2), which will be preferably, but not necessarily, forward and aft of the cross line of flight direction. In the example of FIG. 2, the numbers 41, 42, 43, 44 . . . indicate the sequence of images generated by the camera and the position of the aircraft when the images were generated. Note that image 41 is taken in a forward looking direction, image 42 is taken in aft looking direction, image 43 is taken in a forward looking direction, etc. The sequence indicates the repeating pattern of forward looking images (odd numbers) and rearward looking images (even numbers) to generate high aspect stereo pairs in which any given point on the ground is imaged from forward and aft-looking perspectives.

As is shown in FIG. 2, as the aircraft flies past the terrain of interest, the coverage of the ground will be such that any point in the terrain of interest will have been imaged from two different perspectives, e.g., frames 41 and 48 cover essentially the same territory from forward and aft perspectives, respectively. The overlap may be nearly 100 percent. The degree to which the stereoscopic images have a high aspect will depend on the values of θ1 and θ2. Preferably, but not necessarily, θ2=−θ1, where θ=0 indicates the azimuthal angle in the cross-line of flight direction.

In a typical embodiment, the value of θ1 and θ2 is ±θ, where θ will typically be assigned a value of between 5 and 20 degrees. The camera is commanded to look forward, for example ±θ° for the first scan cycle which covers a particular point on the ground. One image, or a plurality of images, are obtained in the cross-line of flight direction at this azimuthal position. The camera is rotated to −θ and one or more images are obtained at the new azimuthal angle in the cross line of flight direction. There is a period of delay between taking the first picture of a stereo pair and taking the second picture as the aircraft flies to its position for the second picture. This motion of the aircraft results in the stereo baseline being greatly increased as compared to prior art methods with a single camera, and the stereo angle ($\phi_s$) is 2θ° (θ1−θ2, where θ2=−θ1). The time between the first scan of a specific target location and the second scan of the same location is occupied with covering all other ground points within the covered swath with first and second pictures also, as indicated in FIG. 2, and with the same specific stereo angle of 2θ°. This operation is illustrated in FIG. 2. Basically, all odd-numbered scans (41, 43, 45, 47, etc.) are taken with a forward azimuth angle offset (θ), and all even-numbered scans (42, 44, 46, 48, etc.) are taken with an aft azimuth angle offset (θ). The forward azimuth angle and the aft azimuth angle may be equal and opposite, or they may be different, in the most general case.

When the time required to step the camera line of sight from azimuth ($\theta_1$) to azimuth ($\theta_2$) is less than the inter-frame time of the camera, there is basically no reduction in stereo cross line of flight coverage capability, because every ground point is captured in two scan cycles. Additional coverage in the cross-line of flight direction can be achieved with using large format arrays, pan scanning in the cross line of flight direction, or other techniques, such as stepping across the line of flight, or continuous "roll-framing" as described in the pending patent application of Andrew J. Partynski et al., Ser. No. 09/654,031 filed Aug. 31, 2000, the contents of which are incorporated by reference herein. Thus while the example of FIG. 2 illustrates a most general application of the inventive method, it can be employed in a multitude of advanced camera types.

One operational advantage is that the two pictures of the target can have nearly 100% overlap, with the result that the stereo mate to an image is not distributed over two other pictures as is the case when 56% overlap is used for stereo, for example in the situation shown in FIG. 1A. The generation of the stereo pair in a ground station for the aerial reconnaissance camera is simplified. The effect of the small image rotation is not significant and can be removed by derotation at the display station. The larger stereo base angle provides significantly greater stereo effect and ranging accuracy. The limiting stereo base angle available using the traditional stereo collection technique is shown in FIG. 1 as angle $\phi_s$. Angle $\phi_s$ can be shown to be equal to the distance traveled by the aircraft between pictures divided by the slant range to the point of interest. With 50% or more forward overlap required for coverage of any ground point in at least two pictures, the distance traveled between pictures can be no more than one half times the foreground length of the camera footprint. The angle $\phi_s$ is then no more one half times the field of view of the camera, expressed in degrees.

The field of view of a camera, in degrees, is given by

FOV=2 Arctan (0.5*Format length/Focal length).

For typical reconnaissance cameras the FOV has a value in the 1° to 10° range, and the corresponding maximum stereo angle is in the 0.5° to 5° range. Reconnaissance cameras with azimuth pointing capability can typically point ±6° to ±10°. In general, cameras in industrial or other non-reconnaissance roles can be made to step through greater angles in azimuth. The range improvement allowed by the present invention is then on the order of 20°/0.5°, or up to a 40:1 increase in range for a given stereo effect.

The technique is general in nature and can apply to any camera operating in any spectral region as long as the camera has pointing capability (in azimuth for side oblique reconnaissance or in pitch for forward oblique/nadir/aft oblique reconnaissance). It can apply to line scanning systems as well as to framing systems, although line scanning cameras would have difficulty achieving effective extended baseline stereo because of their generally slower scan rates and the variable perspective throughout the scan. Thus, a framing embodiment (in either film or electro-optical devices) is preferred. The present invention is not limited to aerial reconnaissance but applies to surface and underwater imaging as well as to industrial and medical applications.

Figure 5:
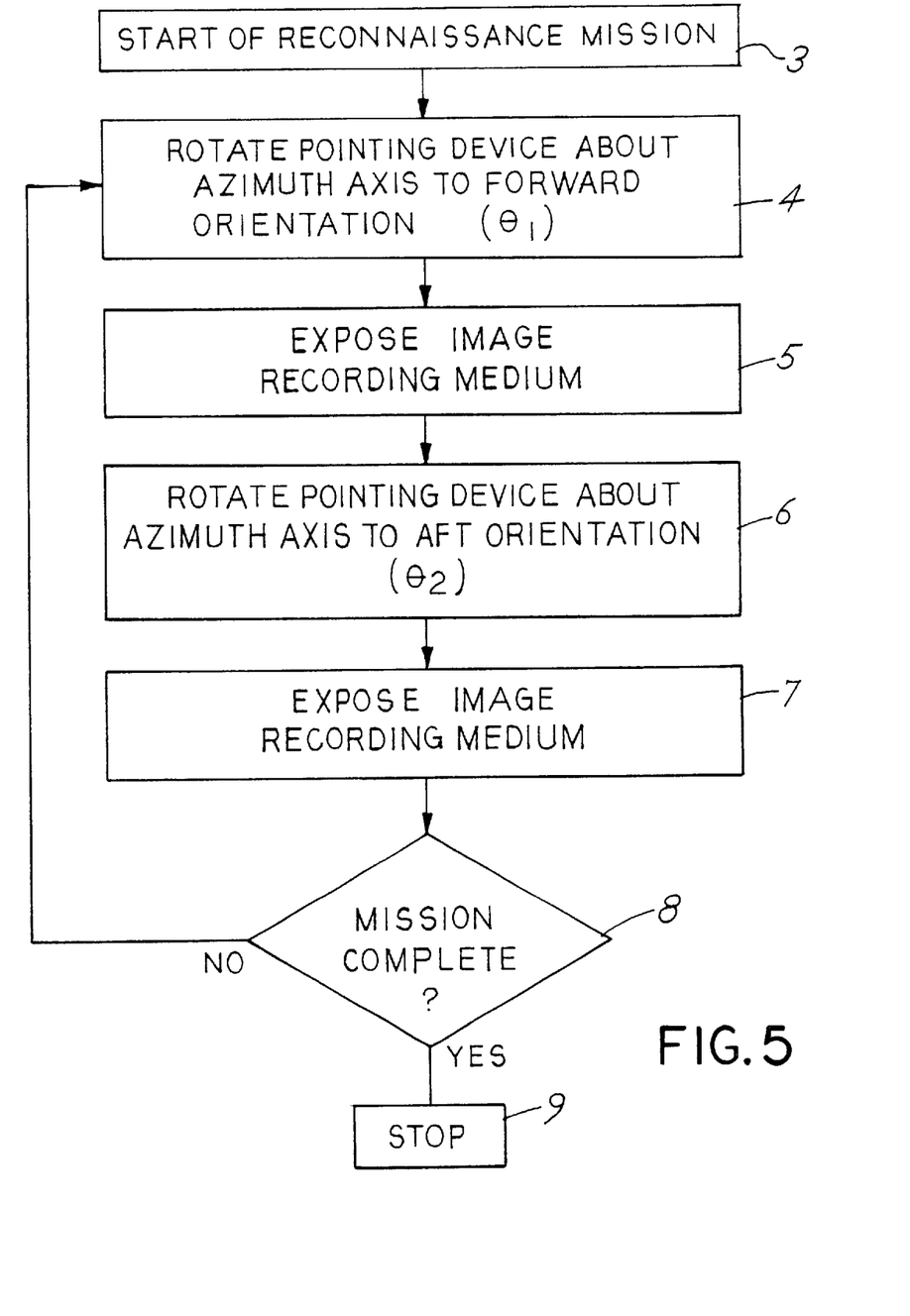
FIG. 5 is a flow chart showing the steps of the method of generating high aspect stereo images shown in FIG. 2.

With reference to FIG. 2 and the flowchart of 5, the embodiment of FIG. 2 will be described in still more detail. At the start of the reconnaissance mission (item 3 in FIG. 5), the pointing device of the camera is rotated about an azimuthal axis to a first orientation, which will be typically forward of the cross line of flight direction, indicated as 4 in FIG. 5. Then the image recording medium is exposed at this azimuthal orientation, indicated as 5 in FIG. 5. Then, the pointing device for the camera is rotated about the azimuthal axis to a second orientation, which will typically be aft of the cross-line of flight direction, such as −θ, as indicated at 6. The image recording medium is then exposed, step 7. Finally, at step 8, a check is made to see if the reconnaissance mission is complete (i.e., has the aircraft flown past the terrain of interest an amount sufficient that the last exposure at θ=θ2 captures the terrain of interest. If not, the method loops back to step 4 as shown in FIG. 5 and the process of steps 4, 5, 6, 7 and 8 repeats. When the last aft-looking image is generated the reconnaissance mission ends 9. FIG. 2 shows the generation of 8 images (41, 43, 45, 47, 48, 50, 52 and 54) of the terrain as an aircraft 22 flies past the terrain of interest 42, during which time the loop comprising steps 4, 5, 6, 7 and 8 of FIG. 5 is executing.

Figure 3:
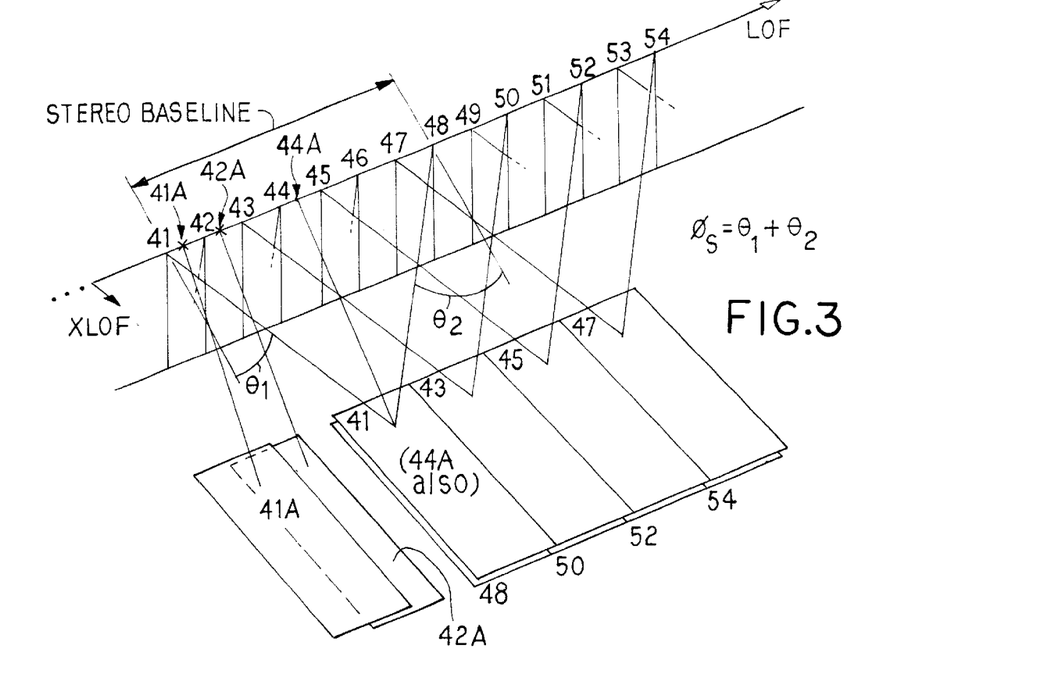
FIG. 3 is a schematic illustration similar to FIG. 2, showing a mixed mode of operating with the camera generating an image in the cross line of flight direction as the camera is rotated between values of ±θ.

As shown in FIG. 3, it is possible to position the pointing device at an intermediate value of θ (such as θ=0, cross line of flight) and generate an image at this position indicated by images 41A, 42A, 44A in FIG. 3. As such, the camera is capable of mixed mode operation; that is, simultaneous operation in the high aspect stereo mode and the non-stereo single image capture mode.

Note further that the individual images of the terrain at any given azimuthal angle can be obtained as line scanned images across the line of flight, or frames of imagery.

Figure 4:
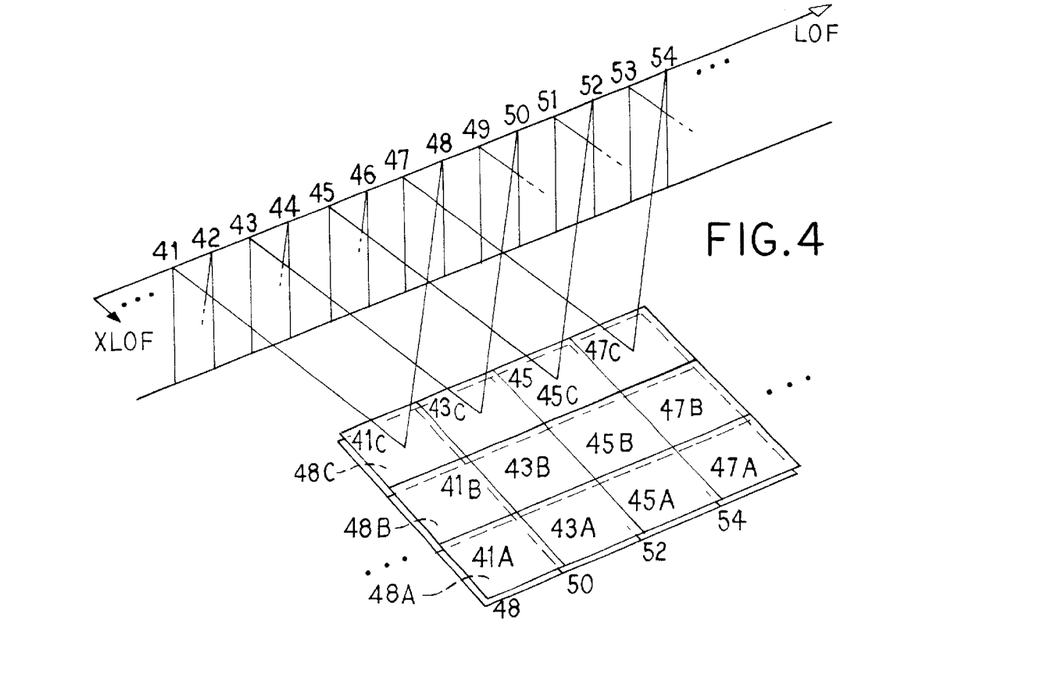
FIG. 4 is a schematic illustration similar to FIG. 2, but showing an alternative implementation in which a stepping operation in the cross line of flight direction by changing the camera depression angle between successive exposures of the camera; the stepping is performed at each azimuthal position of the camera. Each of the images of FIG. 2 is composed of the several individual images depicted in FIG. 4.
Figure 6:
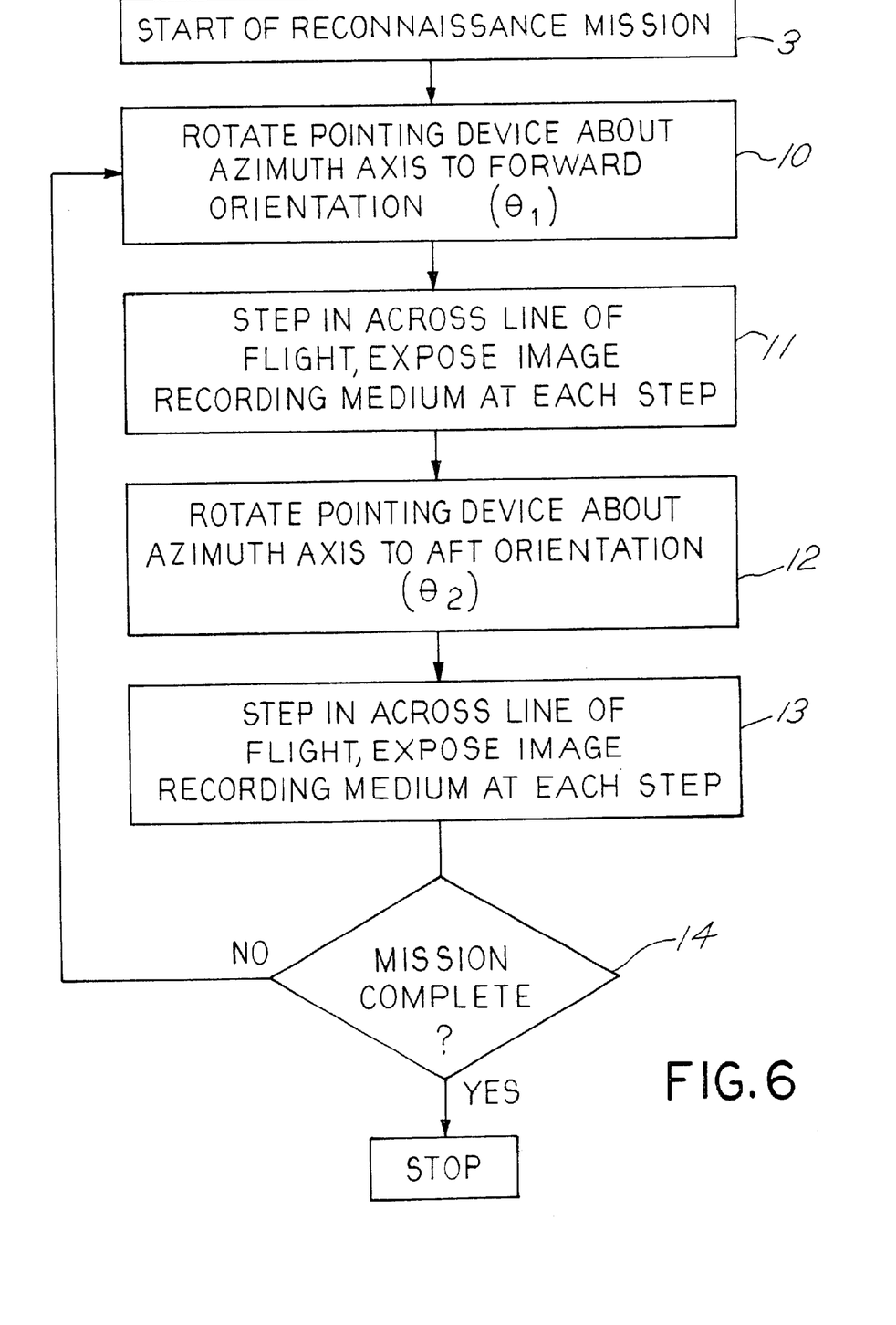
FIG. 6 is a flow chart showing the steps of the method of generating high aspect stereo images shown in FIG. 4.

FIGS. 4 and 6 illustrate an alternative embodiment in which not only is the camera pointing device repeatedly rotated about the azimuthal axis to two different positions to generate high aspect stereo, but also the camera steps across the line of flight to generate wide scene coverage in the cross-line of flight direction in a step framing mode. The method generates overlapping images, 41A, 41B, 41C at forward position 41, images 43A, 43B and 43C at forward position 43, etc., and images 48A, 48B and 48C, etc. from aft-looking orientations. The borders of the images are shown perfectly aligned in the cross line of flight direction but in actuality they will be staggered due to forward motion of the aircraft between the exposures of the images in the cross line of flight direction. See FIG. 6A.

Figures 6A, 10:
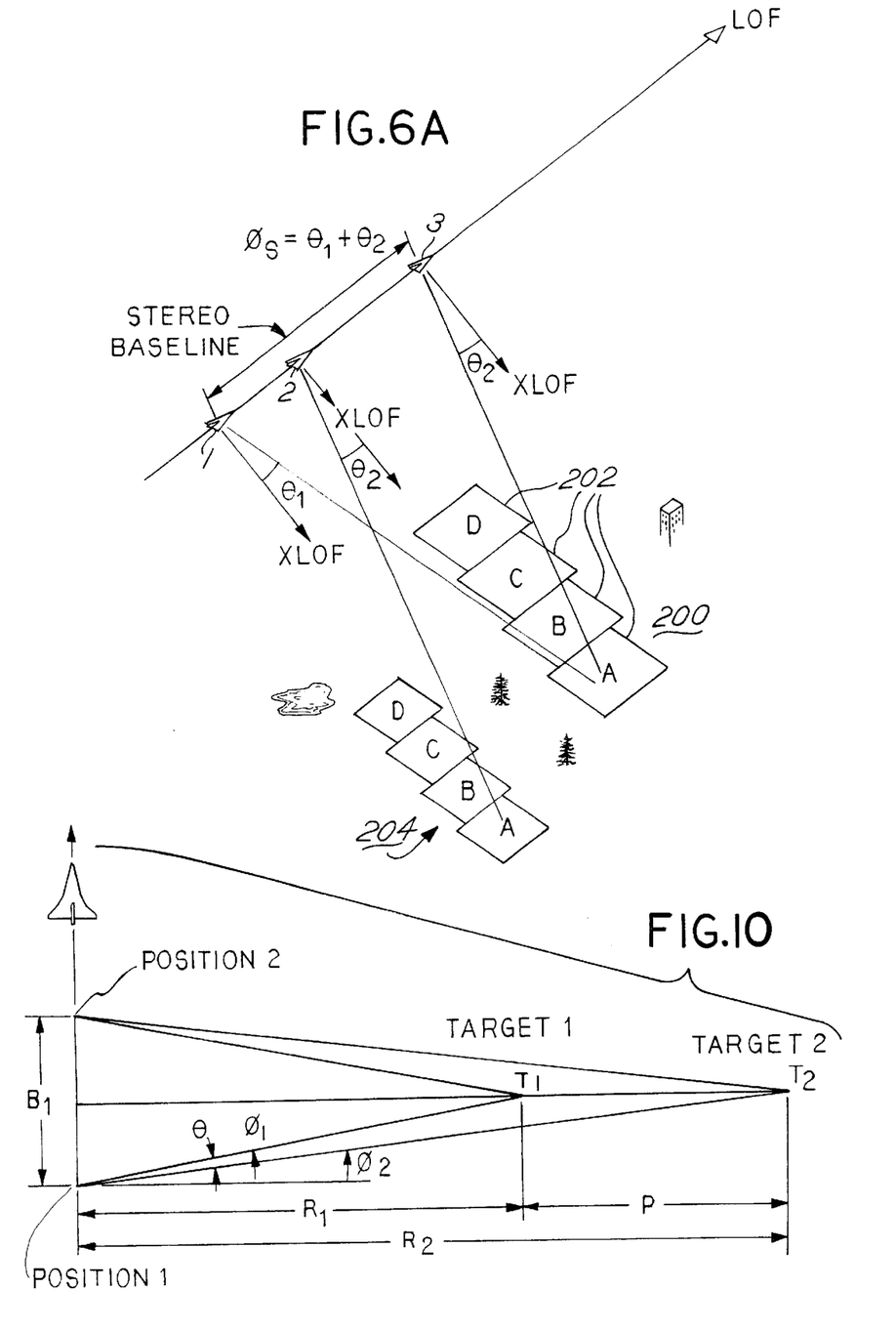
FIG. 6A shows the method of FIG. 6 carried out by an aerial reconnaissance vehicle for one iteration of the loop shown in the flow chart.
FIG. 10 is an illustration of the line of sight to two targets T1 and T2 from two positions as an aircraft flies past the targets, showing the various parameters that demonstrate the improvement with range resolution with high aspect stereo.

The method of FIG. 4 is summarized in flow chart form in FIG. 6. Following the start of the reconnaissance procedure 3, the pointing device of the camera is rotated about an azimuthal axis to a first orientation (step 10), which will be typically forward of the cross line of flight direction. Then the image recording medium is exposed at this azimuthal orientation in a series of exposures at different camera depression angles, generating images 41A, 41B and 41C in FIG. 4 (step 11). (Note that while the camera takes the images, the forward edge of the footprint moves forward slightly, as shown in FIG. 6A at 200 for the four images 202 designated A, B, C and D.) Then, the pointing device for the camera is rotated about the azimuthal axis to a second orientation, which will be typically aft of the cross-line of flight direction, such as −θ, as indicated at step 12. Then the image-recording medium is exposed, step 13, in a series of exposures at different camera depression angles. This is shown in FIG. 6A as images 204 taken at aircraft position 2. At step 14, a check is made to see if the reconnaissance mission is complete (i.e., has the aircraft flown past the terrain of interest an amount sufficient such that the terrain of interest has been captured in both forward and aft looking perspectives). If not, the method loops back to step 10 in FIG. 6 and the process of steps 10, 11, 12, 13 and 14 repeats as shown. At position n in FIG. 2, the aft oriented camera takes four images that will overlap the images 200. The stereo baseline is the distance between positions 1 and n as indicated in FIG. 6A. When the last aft-looking image is generated the reconnaissance mission is deemed completed.

While the above examples of FIGS. 2–4 and 6A illustrate a side oblique mode, the principles of operation of the camera are the same should the reconnaissance mission be one in which the aircraft flies directly over the terrain of interest. In this latter case, the camera pointing device alternates between two different camera depression angles (rotations about the pitch axis), with the first angle typically being forward of nadir and the second typically being aft of nadir. The camera could step across the line of flight as shown in FIG. 4 and FIG. 6A, or a single frame of imagery could be obtained at each position of the pointing device. Eventually, as the aircraft flies over the terrain of interest each point on the ground will have been imaged from forward and aft perspectives with a high baseline, resulting in high aspect stereo coverage of the terrain.

DETAILED DESCRIPTION OF STEP FRAME CAMERA EMBODIMENT

Figures 7A, 7B:
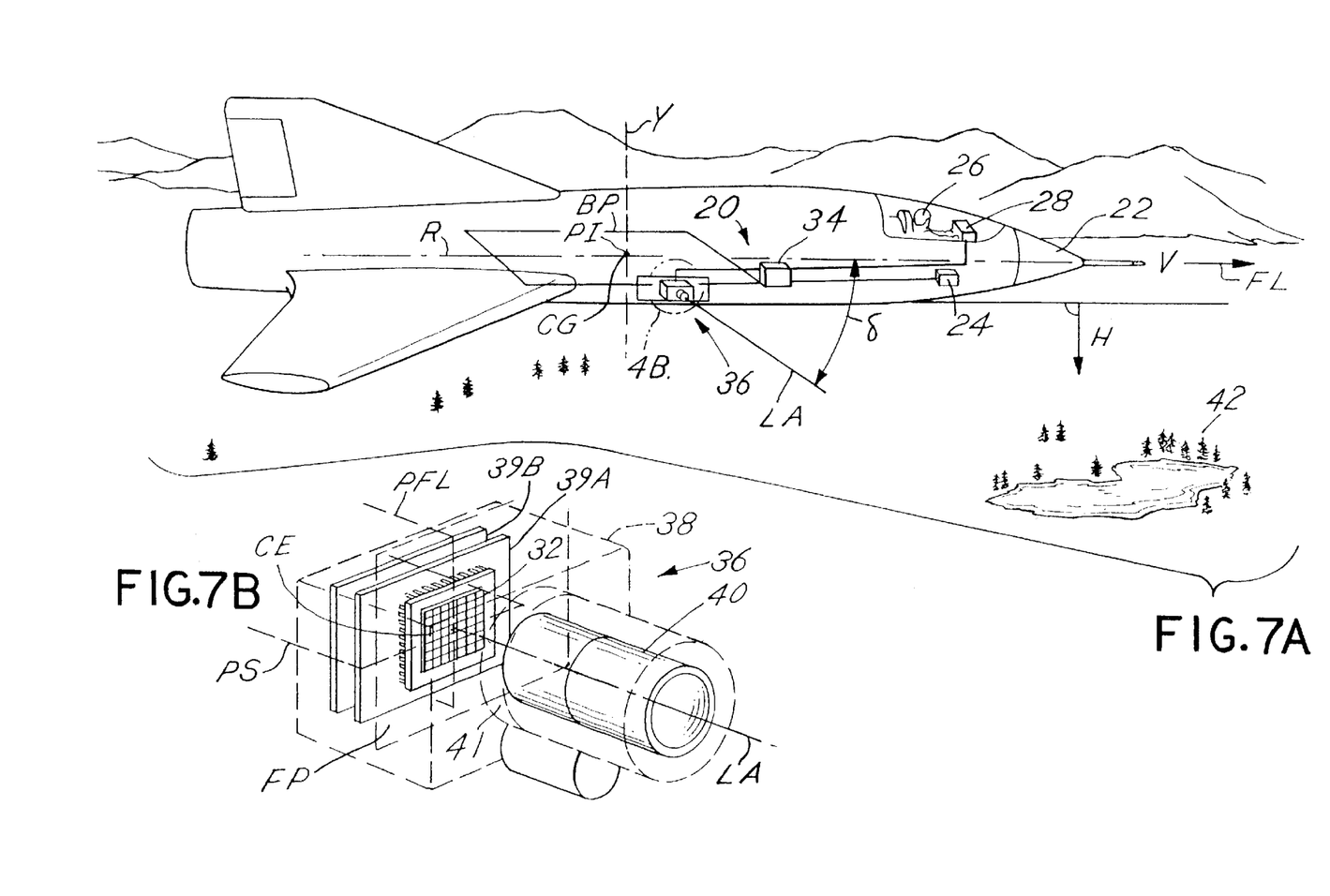
FIG. 7A is a perspective view of an aircraft flying over a terrain of interest having a reconnaissance system which can be used to generate the imagery shown in FIGS. 2–4.
FIG. 7B is a more detailed illustration of the lens and imaging array for the camera of FIG. 7A.

Referring to FIG. 7A, an embodiment of camera with azimuth pointing and stepping operation that can be used to generate high aspect stereo imagery in accordance with the techniques of FIG. 2, 3 or 4, in either side oblique or forward oblique/nadir/aft oblique modes, will now be described in further detail. A reconnaissance system 20 is shown installed in a aircraft 22 that defines orthogonal roll, pitch and yaw axes R, PI and Y, respectively, each passing through a center of gravity CG. The roll and pitch axes define a bilateral plane BP that is horizontal during level flight. System 20 includes a camera assembly 36 defining a lens axis LA that can be rotated about an azimuthal axis such that terrain forward and aft of the cross line of flight direction can be imaged on the image recording medium (film or E-O detector). The illustrated embodiment is step frame camera which has stepping and derotation equipment placed in front of the camera lens such that the scene can be stepping in the cross-line of flight direction (i.e., in depression), and the camera can be rotated in the azimuth axis. It is not a requirement that the camera have inherent azimuth pointing ability. The entire camera can alternatively be mounted in a gimbal, which affords rotation in the azimuth axis to achieve the same result.

The aircraft 22 has an avionics system 24 which provides to the system 20 input signals indicating aircraft ground velocity (V), aircraft height above ground (H). From a camera control console 28, an operator 26 provides additional inputs into system 20, such as an initial camera depression angle δ between axis LA and plane BP, the stereo angle $\phi_s$ and the values of θ.

The inputs from the avionics system 24 and console 28 are fed to a camera control computer 34 which processes the inputs, together with pre-flight programmed information, and generates the control signals for camera assembly 36.

Referring to FIG. 7B, camera assembly 36 includes an imaging array 32 defining a focal plane FP having a center point CE. Camera assembly 36 also includes a housing 38 and a lens 40 having a focal length f (not shown in FIG. 7B) and defining axis LA that passes through point CE. The stepping mechanism and derotation equipment is not shown in FIG. 7B so as to better illustrate the lens 40 and array 32. A shutter 41 is provided to selectively expose array 32 to radiation from the scene. Typically, housing 38 is isolated from the aircraft 22 in order to reduce vibration or other high frequency, low-amplitude motions. Printed circuit boards 39A, 39B incorporate the electronics that support operation of array 32. A fan or fans (reference numeral 63 in FIG. 8A) circulate air in the camera housing 38 to help keep the electronics and array cool. These temperature control techniques are conventional and well known in the art. The type of image recording medium is not important. A film magazine could be substituted for the imaging array 32. The present discussion will refer to an electro-optical medium since that is a preferred embodiment.

Figure 8A:
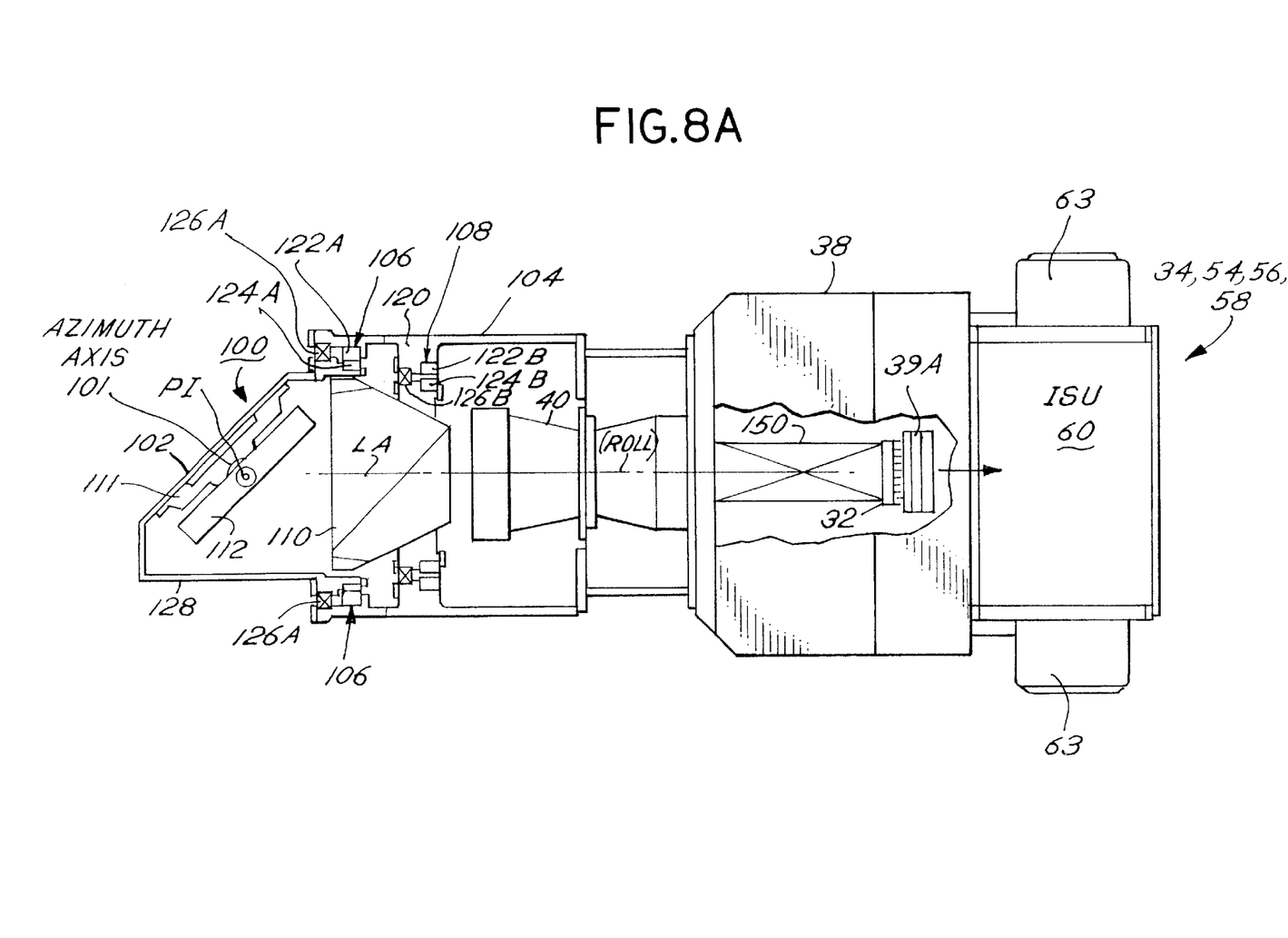
FIG. 8A is an illustration of a step frame camera of FIG. 7B.

Referring now to FIG. 8A, the camera assembly 36 of FIGS. 7A and 7B is shown in an assembled condition with a pointing and stepping mechanism 100 placed in front of camera housing 38, lens housing 104 and lens 40, in alignment with the lens axis LA. An image sensor unit (ISU) 60 is placed directly behind the array 32. The image sensor unit 60 includes the camera control computer 34, the drive control electronics circuitry 54, the signal processing circuitry 56, and the master clock 58, which are all discussed in detail below. Fans 63 circulate air in the camera housing 38 and image sensor unit 60. Incident light comes through a window 128, where it is reflected off mirror 112 towards lens 40.

The stepping mechanism 100 includes a housing 102 that encloses a stepping drive assembly 106 that moves the stepping (or pointing) mirror 112 in a series of discrete angular steps in a cycle, to cause the array 32 to generate a series of frames of a scene in a cross-line of flight direction. The stepping drive 106 includes a rotor 122A and stator 124A. Bearings 126A isolate housing 102 from housing 104. The stepping mechanism 100 also includes a derotation means (such as a pechan prism) 110 and a derotation drive 108. The derotation drive 108 includes rotor 122B, stator 124B and bearing 126B. An azimuth drive 101 is mounted parallel to the aircraft yaw axis Y to rotate the camera pointing mirror 112 about an azimuthal axis (parallel to the yaw axis) or about the pitch axis depending on the orientation of the camera relative to the aircraft. The stepping in azimuth (or pitch) is about a value ±θ in accordance with the technique shown in FIG. 2. Sufficient clearance between the mirror and the mirror mounting structure 111 should be provided so as to enable sufficient rotation of the stepping and pointing mirror 112.

The derotation drive 108 steps the pechan prism 110 in the same direction as the stepping mirror 112, and has the effect of removing rotations introduced in the image by the rotation of the stepping mirror 112 about lens axis LA. The pechan prism 110 is stepped at one-half the angular increment of the stepping mirror 112. Pechan prisms 110 are per se known in art. Detailed information on pechan prisms is contained in MIL-HNBK-141. p. 13–36, and U.S. Pat. Nos. 3,981,574 and 4,080,056, which are incorporated by reference herein.

It should be noted that rotational effects caused by the rotation of the stepping mirror 112 could also be removed by rotation of the camera housing 38 about lens axis LA, or rotation of the array 32 or image recording medium itself. Other equivalent devices to the pechan prism 110 can be used for the derotation, such as a K mirror (a three mirror assembly), a dove prism, or a delta prism, each of which is well known to persons of skill in the art. The rotation in azimuth does not introduce rotations in the image. Therefore, the derotation pechan prism 110 is only needed when stepping in the cross line of flight direction (as shown in FIG. 4) is performed. Otherwise, it is not needed.

Alternatives to the stepping mirror 112 can be used to direct light from the scene onto the array 32. For example, a stepping prism rotated by the stepping drive 106 will accomplish the same result.

Two-axis stepping of the mirror 112 may be performed without the use of a second stepping prism and drive. The stepping mirror 112 is stepped in two axes, for example, azimuth and depression and the pechan prism 110 is rotated about the roll axis. With two axis stepping, the camera can generate a series of frames of a target from multiple perspectives as the aircraft flies past the target, or align the cross-line of flight frame boundaries so as to be co-linear.

Figure 8B:
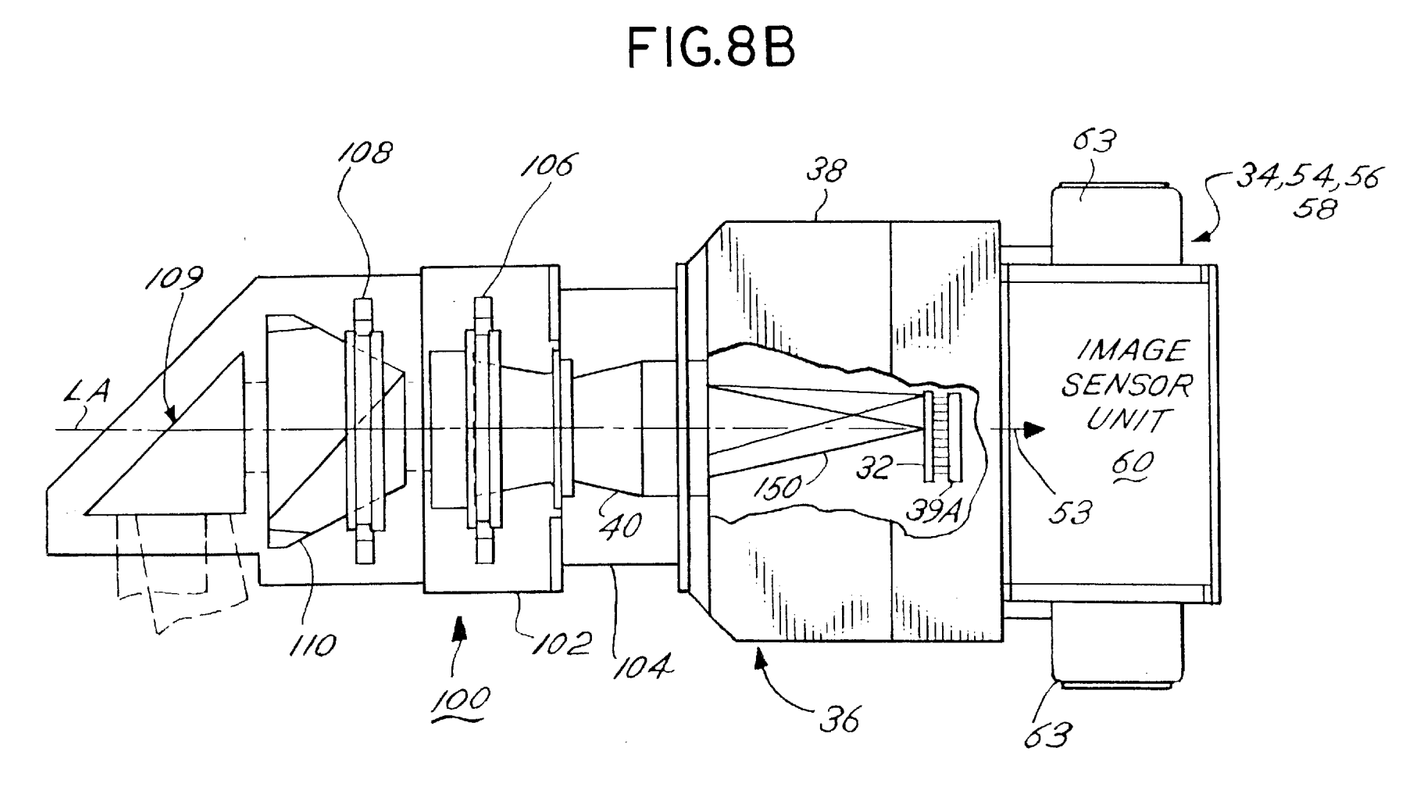
FIG. 8B is a detailed illustration of another alternative embodiment of the camera of FIG. 8A.

Another alternative embodiment is shown in FIG. 8B, in which a stepping prism (such as a right angle prism) 109 is used in place of the stepping mirror 112 of FIG. 8A. The choice between the embodiments of FIGS. 8A–8B depends on factors such as cost and weight. Similarly, derotation mechanisms other than the pechan prism may be preferred because of size, cost or weight. The embodiment of FIG. 8A is presently preferred due to the fact that the stepping mechanism 100 has less mass, and the stepping drive 106 has less mass to rotate. However, it will be understood that other embodiments may be preferred for other implementations. Alternative embodiments are described in the Lareau et al. U.S. Pat. No. 5,668,594 and the SPIE articles cited previously.

Figure 8C:
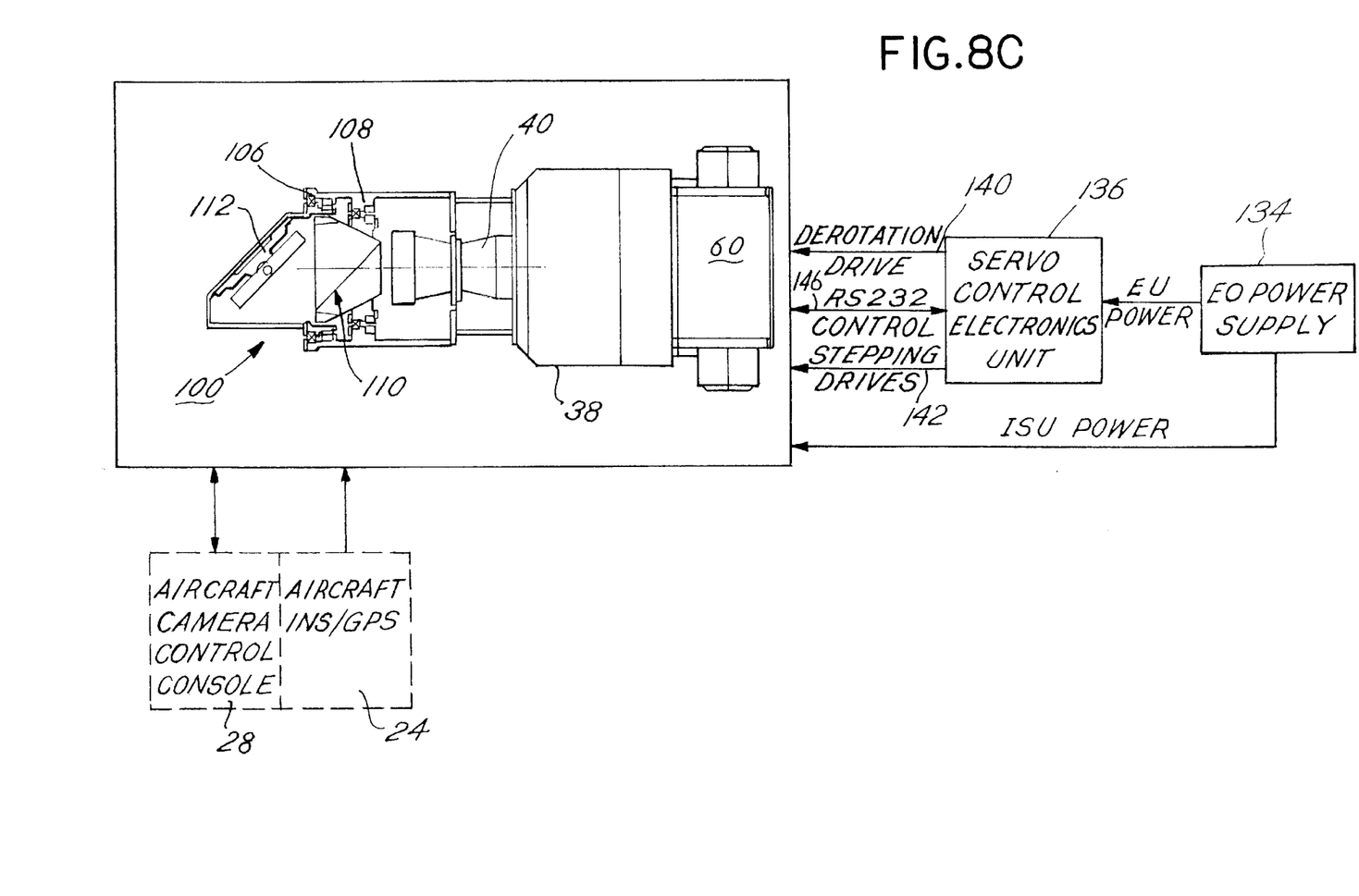
FIG. 8C shows the camera of FIG. 9A with additional electronics.
Figure 9:
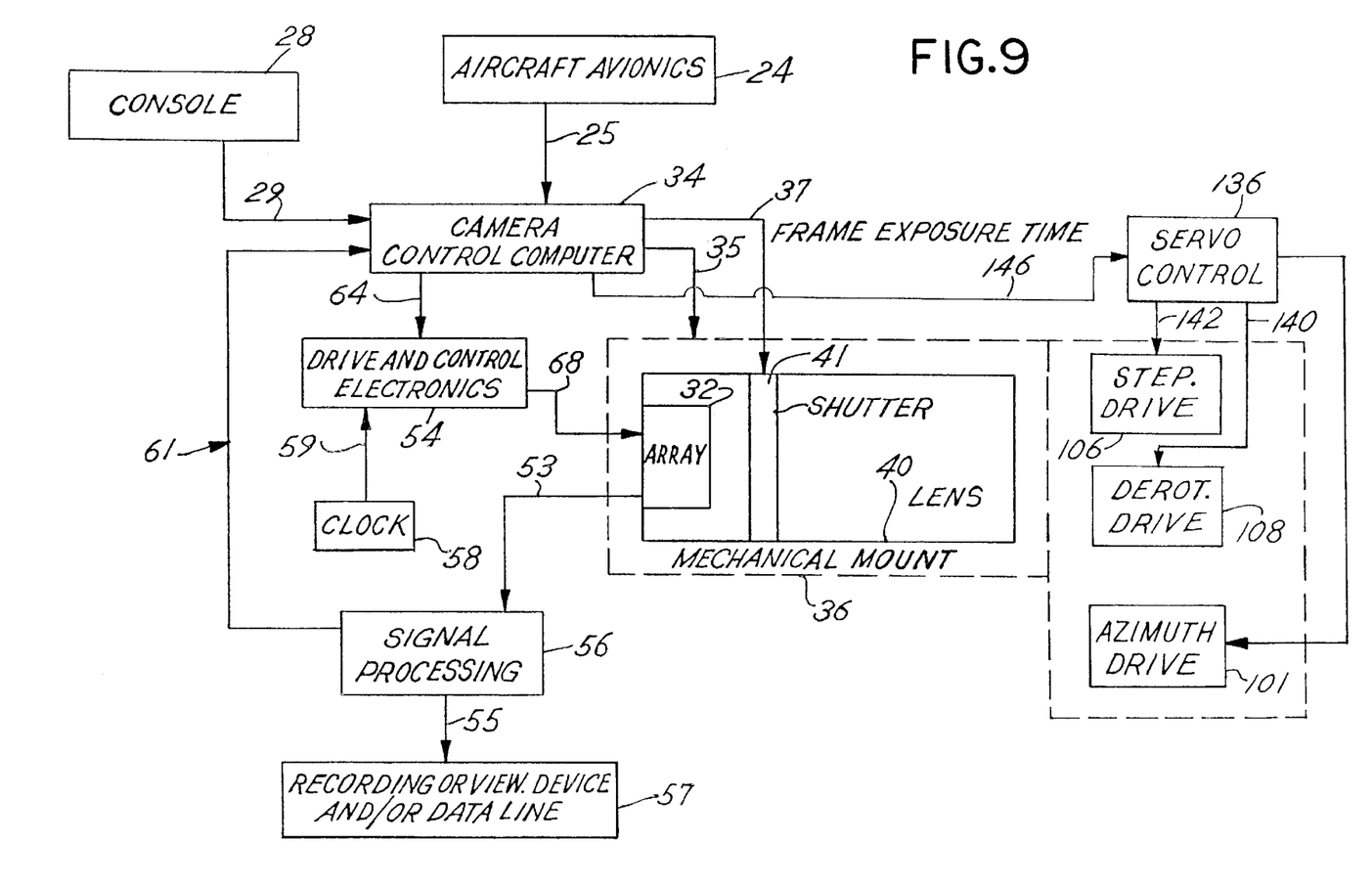
FIG. 9 is a block diagram of the camera of FIG. 8A.

Referring to FIG. 8C, the embodiment of the camera assembly 38 and stepping mechanism is shown in conjunction with the additional support electronics and aircraft inputs, shown in block diagram form. The aircraft Inertial Navigation System (INS) and Global Positioning System (GPS) data is supplied to the camera's Image Sensor Unit (ISU) 60, along with the operator input from cameral control console 28. (See also FIG. 7A). A power supply 134 supplies power to a servo control electronics unit 136 and to the ISU 60. The servo control electronics unit 136 supplies commands via bus 140 to the derotation drive 108, and by bus 142 to the stepping drive 106 and azimuth drives. An RS 232 interface 146 is provided to the camera control computer 34 (FIG. 9).

As can be seen from FIG. 8A and the above discussion, the illustrated embodiment which supports both azimuthal pointing and stepping across the line of flight embodiment is a 3 axis system, with a stepping drive 106, an azimuth drive 101, and a derotation drive 108. Two axis stabilization is provided by the stepping and azimuth drives. The stepping drive 106 performs the step motion about the roll axis as shown in FIGS. 2–4. The azimuth drive 101 provides for the forward and aft looking orientation of the camera to achieve high aspect stereoscopic images as shown in FIG. 2. The derotation drive 108 removes the image rotation caused by the motion of the stepping drive 106. In general, the derotation drive 108 is mounted on and moving with the stepping drive 106. Position sensors (not shown) regulate the derotation motion on the stepping and derotation drives.

The operating of the stepping camera is as follows. Referring to FIGS. 4, 6, 7A and 8A, the stepping element (prism or mirror) is rotated to a value of θ=+θ and pointed to a predetermined depression angle $\delta_1$ from the horizontal plane BP. During a predetermined framing interval, the shutter 41 is opened and the image is directed on to the array 32. During the framing interval, image motion compensation is performed in the array 32 in the manner described the Lareau '597 or using another appropriate technique. After the proper amount of scene exposure (depending on, e.g., light level), the shutter 41 is closed. At the end of the framing interval, the stepping mirror 112 steps about the roll axis a discrete preselected angular step across the field of interest to a new depression angle $\delta_2$. During the period of time in which the stepping mirror 112 makes the transition to the second position, the pixel information in the array 32 corresponding to the first image is read out to a data storage device. When the stepping mechanism 100 is in the second position, the second framing interval begins, and the shutter 41 opens and the generation of the second frame of imagery occurs. Image motion compensation is again performed in the array, taking into account the new depression angle, and updated velocity and height information. At the end of the second framing interval, the data is read out of the array 32 as the stepping mechanism 100 steps a predetermined angular step of the third position, with the camera depression angle being $\delta_3$. The image generation and image motion compensation process is repeated in the third framing interval. This process repeats for a finite number of steps (for example, 3 or 6). After the last framing interval, the data from the last image is read out, during which time the stepping mechanism 100 retraces back to the initial angular position $\delta_1$.

The mirror is then rotated to a new value of θ, such as −θ. For example, if the first series of images were taken at θ=+θ, then the new value could be e.g. θ=θ or θ=0 degrees (cross line of flight). A new series of frames in the cross line of flight is obtained at the new azimuthal position. The cycle of a finite number of steps, separated in time by framing intervals, and rotation to a new value of θ, is repeated as necessary as the aircraft flies over the terrain of interest. One embodiment, such as in FIGS. 2 and 4, is a series of values of θ of +θ, −θ, +θ, −θ, etc. It is course possible and within the scope of the invention to vary the values of θ as the aircraft flies past the scene of interest, e.g., +θ, −θ, +θ±ε1, −θ±ε2, +θ±ε3, etc.

Referring to FIG. 9, the camera assembly 36 and its associated control circuitry are illustrated in block diagram form. Avionics system 24 provides velocity and height information over a bus 25 as inputs to camera control computer 34. From console 28, the operator inputs into computer 34 over a bus 29 the initial and final depression angles $\delta_1$ and $\delta_N$ in degrees in the stepping direction (if such stepping is performed) and the values of θ or $\phi_s$. Stored in computer 34 are mission parameters that are previously determined, e.g., focal length f of lens 40, the mode of operation (side oblique or forward oblique, mixed mode), the size of array 32, number and column groups, pixel size, and a control circuit master clock frequency (discussed below).

Note that all values of θ could be either forward or aft of the cross line of flight direction in a less preferred embodiment.

After processing the data inputs, computer 34 transmits signals over a bus 35 that enable lens axis LA of camera 36 to be directed to the desired orientation, transmits signals over a bus 37 that controls the frame exposure time period by enabling opening and closing of shutter 41, and transmits command signals over a bus 64 to the drive and control electronics 54. Drive and control electronics 54 transmits signals over a bus 68 that organizes the columns of array 32 into one or more groups and that transfer pixel information located in the one or more groups at one or more predetermined transfer rates for purposes of image motion compensation in a side oblique mode. A master clock 58 issues pulses over a conductor 59 at a predetermined master clock frequency to drive and control electronic 64. Alternatively, the master clock pulses may be supplied by computer 34. Scene information in imaging array 32 is fed over a bus or cable 53 to a signal processing unit 56 which, in turn, sends the information over a bus 55 to a recording or viewing device 57, or to a data link for transmission to a remote location. Signal processing unit 56 also provides exposure control feedback to computer 34 over a bus 61 so that the frame exposure time may be adjusted to optimize signal collection. The servo control 136 issues commands to the stepping prism drive 106, azimuth drive 101 and the derotation drive 108, thereby controlling the operation of the stepping mechanism 100 (FIG. 8A) where such stepping is performed.

Further details on the clocking structure and possible image motion compensation techniques are described in the patent literature and therefore omitted from the present discussion. See U.S. Pat. Nos. 5,668,593; 5,798,7865 and 5,155,597, all to Lareau et al., the contents of which are incorporated by reference herein. The image motion compensation techniques are not particularly pertinent to the present invention and other alternative techniques can be used.

It is also possible that the camera could be used to scan forward and aft of nadir in an embodiment in which the camera flies directly over the terrain of interest, with the camera varying the depression angle between two values, e.g., 90±6, where a depression angle of 90 indicates the camera is oriented at nadir directly below the aircraft. In this embodiment, the camera is installed in the reconnaissance pod rotated 90 degrees about its long axis parallel to LA such that the azimuth drive 101 of FIG. 8A rotates the stepping mirror 112 about the pitch axis PI instead an about the azimuthal axis Y.

Impoved Range Resultion with High Aspect Stereo

The improvement in range resolution for High Aspect Stereo (HAS) compared to normal stereo can be estimated with the help of FIG. 10. This figure represents the lines of sight to two targets, T1 and T2, displaced by a distance P in range from the flight line of a camera in an airplane. The targets are at distances R1 and R2 from the flight line of the airplane. Pictures of the targets are taken from a first position, position 1 and a second position, position 2. Positions 1 and 2 are separated by a baseline distance B. Angles φ1 and φ2 represent the look angles to the targets T1 and T2 with respect to the normal to the flight line of the airplane at the time the first picture is taken. Targets T1 and T2 are separated by the minimum distance allowed by the resolution of the optical system, and their angular separation measured at position 1 is ε. From the geometry of the diagram, Tan(phi 1)=B/(2*D1), and Tan(phi 2)=B/(2*D2). Since ε=φ1−φ2, it can be shown that the minimum detectable range separation P can be expressed as $P = R2 - R1$ $= (B/2)\{Tan(\epsilon) * [(Tan(\phi 1))^2 + 1]\} / \{[Tan(\phi 1)] * [Tan(\phi 1) - Tan(\epsilon)]\}$.

ε can be shown to be the tangent of the reciprocal of the resolving power of the camera, f*v, or Tan(ε)=1/(f*v), where f is the focal length in units of length, and v=maximum resolution of the system in cycles per unit length.

Thus the relative range resolution is given by $$\Delta R = P/(B/2)$$
$$= \{1/(f^*v)^*[(Tan(\phi 1))^{\wedge}2+1]\}/\{[Tan\ (\phi 1)]^*[Tan(\phi 1)-1/(f^*v)]\}$$

For normal stereo, the forward look angle φ1 is half of the field of view of the camera. For high aspect stereo the forward look angle is half of the field of view plus the forward pointing angle of the camera, such as 6 degrees.

Table 1 gives the improvement in range resolution at 50 cycles/mm spatial resolution for several representative conceptual imaging systems:

TABLE 1

| Focal Length (mm) | Format length (mm) | FOV | ΔR (Normal stereo) | Look Angle deg | ΔR (HAS) | Improvement in range resolution, $\Delta R_{Normal}/\Delta R_{HAS}$ |
|---|---|---|---|---|---|---|
| 100 | 50 | 28.072 | 0.00340 | 20.036 | 0.001705 | 1.996 |
| 500 | 50 | 5.725 | 0.01605 | 8.862 | 0.001686 | 9.52 |
| 1000 | 50 | 2.864 | 0.03205 | 7.432 | 0.001196 | 26.81 |
| 1500 | 50 | 1.910 | 0.04805 | 6.955 | 0.000909 | 52.84 |

For the best range resolution, the normalized range resolution, ΔR in the table, needs to be a small number, the smaller the better. For normal stereo, ΔR increases with increasing focal length, even though the ground resolution decreases at the same time. This is a result of the decreasing stereo base angle (reduced field of view). But for high aspect stereo, the ΔR decreases with increasing focal length, a desirable attribute. This illustrates one of the benefits of high aspect stereo.

Other Embodiments

Presently preferred and alternative embodiments of the invention have been described with particularity. Considerable variation from the disclosed embodiments is possible without departure from the spirit and scope of the invention. For example, the type and structure of the image recording medium is not critical. The details of the optical design, the mechanical system and the electronics may vary from the illustrated, presently preferred embodiments. Furthermore, it is within the scope of the present teachings to perform the high aspect stereo imaging in multiple bands of the electromagnetic spectrum. In this case two separate imaging devices are used to image different portions of the scene at different wavelengths. Representative camera embodiments for dual spectrum imaging are disclosed in U.S. Pat. No. 5,841,574 to Gil Willey, and in the above-cited Partynski et al. U.S. patent application, the contents of both of which are incorporated by reference herein.

The invention is applicable generally to any camera with pointing capability and is certainly not limited to the step frame camera embodiment described at length herein. For example it could be applied to a camera with azimuth or pitch pointing capability and no stepping equipment. Alternatively, it could be applied to a camera that continuously rotates about the roll axis as described in the above-cited Partynski et al. patent application. This true scope and spirit is to be determined by the appended claims, interpreted in light of the foregoing.

I claim:

1. A method of generating continuous coverage high aspect stereo images of terrain of interest on the earth from a single camera installed in a moving vehicle, comprising the steps of:

a) pointing the camera to a first camera orientation and generating an image at said first orientation;

b) changing the pointing of said camera so as to point the camera to a second camera orientation and generating an image at said second orientation, wherein said first and second orientations vary about either the pitch axis of said moving vehicle or an azimuthal axis, said first and second orientations being such that the projection of the camera field of view on the ground at said first and second orientations is substantially different with little or no overlap;

c) repeating steps a) and b) in a series of cycles as said moving vehicle moves past said terrain of interest;

d) wherein said first and second orientations are chosen such that said terrain of interest is imaged at said first and second orientations as said moving vehicle moves past said terrain of interest, the motion of said moving and the selection of said first and second camera orientations allowing said camera to generate a sequence of images which can be combined into high aspect stereo pairs of images of said terrain which provide continuous stereo coverage of said terrain and wherein said high aspect stereo images have a stereo angle greater than the field of view of the camera.

2. The method of claim 1, wherein said steps of pointing comprise the steps of rotating a pointing device for said camera about an azimuthal axis, and wherein said first orientation comprises an orientation forward of a cross-line of forward movement direction.

3. The method of claim 2, wherein said second orientation comprises an orientation aft of a cross-line of forward movement direction.

4. The method of claim 1, wherein said steps of pointing comprise the steps of rotating a pointing device for said camera about a pitch axis, wherein said first orientation comprises an orientation forward of nadir.

5. The method of claim 4, wherein said second orientation comprises an orientation aft of nadir.

6. The method of claim 1, wherein said camera operates to generate frames of imagery at said first and second camera orientations.

7. The method of claim 1, wherein said camera comprises an electro-optical camera.

8. The method of claim 1 wherein said camera comprises a multispectral or hyperspectal camera capable of imaging the terrain of interest in more than one portion of the electromagnetic spectrum at each of said first and second orientations.

9. The method of claim 6, wherein said camera operates to generate a plurality of frames of imagery across the line of flight of said moving vehicle at said first and second orientations.

10. The method of claim 1, wherein said first and second orientations vary by an amount of between 5 and 25 degrees.

11. The method of claim 1 wherein said first and second orientations remain constant during the performance of step c).

12. The method of claim 1, wherein said first and second orientations vary during the performance of step c).

13. The method of claim 1, wherein said first orientation comprises an angle θ forward of a cross-line of forward movement direction, and wherein said second orientation comprises an angle of substantially −θ.

14. The method of claim 4, wherein said first orientation comprises an angle θ forward of a nadir orientation, and wherein said second orientation comprises an angle of substantially −θ.

15. A camera for installation in a moving vehicle, comprising:
- a two dimensional image recording medium;
- a camera pointing device for said camera capable of changing the pointing angle of said camera about an axis; and
- a control system for said camera comprising software and/or hardware operating said camera pointing device to cause said pointing device to perform the following pointing maneuvers:
  1) point the camera to a first camera orientation forward of a cross-line of forward movement direction, said image recording medium generating an image at said first orientation;
  2) change the pointing of said camera so as to point the camera to a second camera orientation, said image recording medium generating an image at said second orientation; said second camera orientation at a second angular value different from said first orientation relative to the cross line of forward movement direction, wherein the projection of the field of view of the camera on the ground is substantially different in said second orientation as compared to said first camera orientation by virtue of said changing the pointing of said camera with little or no overlap, and
  3) repeat steps 1) and 2) in a series of cycles;
- wherein said first and second orientations are chosen such that a terrain of interest is imaged at said first and second orientations as said moving vehicle moves past said terrain of interest, the motion of said moving and the selection of said first and second camera orientations generating a sequence of images which can be combined into high aspect stereo pairs of images of said terrain which provide continuous coverage high aspect stereo imagery where the stereo angle is greater than the field of view of the camera.

16. A camera for installation in a moving vehicle, comprising:
- a two dimensional image recording medium;
- a camera pointing device for said camera capable of changing the pointing angle of said camera about an axis; and
- a control system for said camera comprising software and/or hardware operating said camera pointing device to cause said pointing device to perform the following pointing maneuvers:
  1) point the camera to a first camera orientation forward of a nadir direction, said image recording medium generating an image at said first orientation;
  2) change the pointing of said camera so as to point the camera to a second camera orientation, said image recording medium generating an image at said second orientation; said second camera orientation at a second angular value different from said first orientation relative to nadir, wherein the projection of the field of view of the camera on the ground is substantially different in said second orientation as compared to said first camera orientation by virtue of said changing the pointing of said camera, with little or no overlap, and
  3) repeat steps 1) and 2) in a series of cycles;
- wherein said first and second orientations are chosen such that a terrain of interest is imaged at said first and second orientations as said moving vehicle moves over said terrain of interest, the motion of said moving and the selection of said first and second camera orientations generating a sequence of images which can be combined into high aspect stereo pairs of images of said terrain which provide continuous coverage high aspect stereo imagery where the stereo angle is greater than the field of view of the camera.

17. The camera of claim 15 or claim 16, wherein said image recording medium comprises film.

18. The camera of claim 15 or claim 16 wherein said image recording medium comprises an electro-optical detector.

19. The camera of claim 15 or claim 16, wherein said image recording media comprises a first image recording medium imaging said terrain in a first portion of the electromagnetic spectrum and a second image recording medium imaging said terrain in a second portion of the electromagnetic spectrum.

20. The camera of claims 15 or claim 16, wherein said camera comprises a step-frame camera capable of generating overlapping frames of imagery of said terrain in the cross line of forward movement direction as said moving vehicle flies past or over the terrain of interest.

21. A camera for installation in a moving vehicle, comprising:
- a line scanning camera;
- a camera pointing device for said camera capable of changing the pointing angle of said camera about an axis; and
- a control system for said camera comprising software and/or hardware operating said camera pointing device to cause said pointing device to perform the following pointing maneuvers:
  1) point the camera to a first camera orientation forward of a cross-line of forward movement direction, said image recording medium generating an image at said first orientation;
  2) change the pointing of said camera so as to point the camera to a second camera orientation, said image recording medium generating an image at said second orientation; said second camera orientation at a second angular value different from said first orientation relative to the cross line of forward movement direction, wherein the projection of the camera field of view on the ground is substantially different in said second orientation as compared to said first camera orientation by virtue of said changing the pointing of said camera, and
  3) repeat steps 1) and 2) in a series of cycles;
- wherein said first and second orientations are chosen such that a terrain of interest is imaged at said first and second orientations as said moving vehicle moves past said terrain of interest, the motion of said moving and the selection of said first and second camera orientations generating a sequence of images which can be combined into high aspect stereo pairs of images of said terrain which provide continuous stereo coverage of said terrain and wherein where the high aspect stereo images have a stereo angle greater than the field of view of the camera.

22. A camera for installation in a moving vehicle, comprising:

a line scanning camera;

a camera pointing device for said camera capable of changing the pointing angle of said camera about an axis; and a control system for said camera comprising software and/or hardware operating said camera pointing device to cause said pointing device to perform the following pointing maneuvers:

1) point the camera to a first camera orientation forward of a nadir direction, said image recording medium generating an image at said first orientation;

2) change the pointing of said camera so as to point the camera to a second camera orientation, said image recording medium generating an image at said second orientation; said second camera orientation at a second angular value different from said first orientation relative to nadir, wherein the projection of the camera field of view on the ground is substantially different in said second orientation as compared to said first camera orientation by virtue of said changing the pointing of said camera, and 3) repeat steps 1) and 2) in a series of cycles;

wherein said first and second orientations are chosen such that a terrain of interest is imaged at s said first and second orientations as said moving vehicle moves over said terrain of interest, the motion of said moving and the selection of said first and second camera orientations generating a sequence of images which can be combined into high aspect stereo pairs of images of said terrain which provide continuous stereo coverage of said terrain and wherein said high aspect stereo images have a stereo angle greater than the field of view of the camera.

23. The method of claim 1, wherein said camera comprises a first image recording medium and a second image recording medium, said first and second image recording mediums imaging said terrain in first and second portions of the electromagnetic spectrum at each of said first and second orientations.

* * * * *